United States Patent [19]

Nagle

[11] Patent Number: 4,740,904

[45] Date of Patent: Apr. 26, 1988

[54] LINE FOLLOWING SYSTEM AND PROCESS

[76] Inventor: John B. Nagle, 999 Woodland Ave., Menlo Park, Calif. 94025

[21] Appl. No.: 794,942

[22] Filed: Nov. 1, 1985

[51] Int. Cl.[4] .............................................. G06F 3/14
[52] U.S. Cl. ................................... 364/520; 340/723; 340/730; 364/518
[58] Field of Search ............................ 364/518–521; 340/703, 750, 799, 800, 723, 730; 358/260

[56] References Cited

U.S. PATENT DOCUMENTS

| | | | |
|---|---|---|---|
| 4,051,381 | 9/1977 | Trotel | 250/493 A |
| 4,160,199 | 7/1979 | Bardwell | 318/577 |
| 4,375,654 | 3/1983 | Evans et al. | 358/260 |
| 4,380,700 | 4/1983 | Kallen | 250/202 |
| 4,441,020 | 4/1984 | Sakamoto et al. | 250/202 |
| 4,475,130 | 10/1984 | Miller et al. | 358/335 |
| 4,481,550 | 11/1984 | Miller et al. | 360/77 |
| 4,486,654 | 12/1984 | Browwer | 250/202 |

Primary Examiner—Gary V. Harkcom
Assistant Examiner—H. R. Herndon
Attorney, Agent, or Firm—Michael J. Hughes

[57] ABSTRACT

A line following system (10) adapted for scanning a two dimensional line segment image (12) with a scanner device (16) such that cartesian analog array (22) is created in digital memory as a quantifiable representation of the image (12). The cartesian array (22) is processed by a method of counting consecutive positive bits (32) along a series of selected vectors (36) and vector pairs (38) and storing the data in a count register memory (41) for each working bit (40) selected. The method utilizes a series of working bits (40) until the entire cartesian array (22) has been mapped. The data is then forwarded to a selected output device, such as a digital plotter, a monitor screen or a CAD system. The primary use of the invention is a component of an overall system utilized in CAD for electronic, artistic and architectural applications.

18 Claims, 3 Drawing Sheets

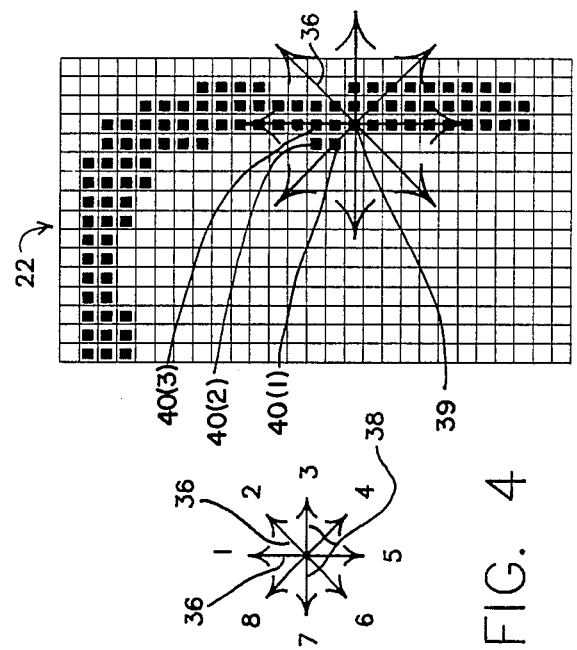
FIG. 5
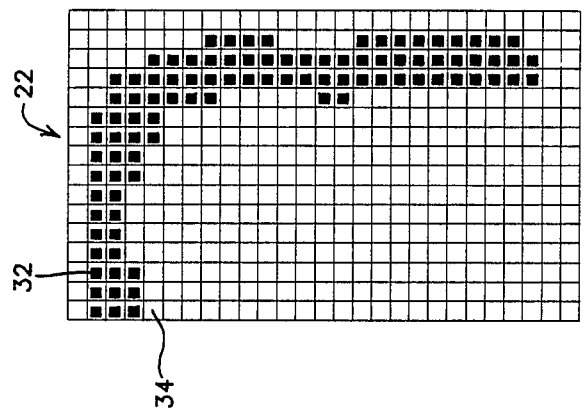
FIG. 4
FIG. 3
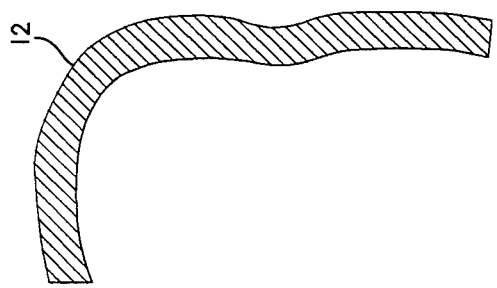
FIG. 2

LINE FOLLOWING SYSTEM AND PROCESS

TECHNICAL FIELD

The present invention relates generally to systems and procedures for transposing an image from one medium to another medium and more specifically to following and/or tracking a two dimensional line or curve segment and providing means for reproducing such a segment in a different medium. The primary current usage of the line following system and procedure of the present invention is in computer aided design systems for tracing modifying and/or reproducing drawings and other two dimensional images.

BACKGROUND ART

Visual representations of various real and schematic elements are extremely important to several technical fields as well as to the world of art. Architecture, for example, substantially involves the transposition of a mental image of a building's shape to the actual construction of the building. Similarly, electronic circuit design involves the usage of conventional drawing techniques to reflect images which are representational of actual components. In each of these circumstances, as well as others, it is extremely valuable to have a means to reproduce the visual images prepared in one aspect of a project for transposition into another aspect. It is also frequently valuable to have the drawings be readily modifiable under such conditions.

One area in which great strides forward have been recently made is that of computer aided design ("CAD") technology. In this field, digital and analog instruments are utilized for aiding in the transposition, modification, and creation of drawings and other visual images. This industry has been growing at an extremely rapid rate and appears to be destined to be the primary medium for future design of architectural items, electronic circuitry and the like.

The transposition of visual images into the computer medium and then back from the computer memory to a physical representation, whether it be on the surface of a visual monitor or on an actual physical print-out such as that created by a plotter, it is a very important aspect of the procedure. Speed and accuracy in achieving this sort of transposition is extremely important for successful results.

Traditionally, the transposition of an image from one physical medium to another took place by way of various mechanical tracing device. A typical draftsperson's equipment includes mechanical tracing machinery adapted for following lines and segments on a reference image and creating a copy of all or part thereof on a separate image. Various modifications of the equipment have been made in order to change the scale, modify the contrast and otherwise alter the original image in some way prior to completion of the object image. A good example of this genre is shown and described in U.S. Pat. No. 4,441,020, issued to T. Sakamoto, et al as the mechanical portion of the device. However, these sort of device tend to require constant effort on the part of the user which can be very painstaking and tedious.

Accordingly, it is desirable to minimize the effort required by the individual and the automate the process as much as is possible. A number of efforts have been made to electronically accomplish various aspects of the procedure. This permits the user to concentrate on the creative and detail aspects of the process rather than to be involved in mere replication. Some examples of attempts made in this area are included in U.S. Pat. No. 4,160,199, issued to F. Bardwell and U.S. Pat. No. 4,475,130, issued to A. Miller, et al. Another procedure for accomplishing similar results is described and shown in U.S Pat. No. 4,375,654 issued to J. Evans, et al. Each of these patents describes techniques utilized for the image transfer process.

An example of a pattern tracing system embodying optical technology, rather than purely mechanical, is shown in U.S. Pat. No. 4,486,654, issued to F. Brouwer. This is appropriate for tracing an image without intermediate modification.

One aspect of the process which is best adapted for accomplishment without constant human intervention is the technique of following or tracing line segments as subsets of the overall image. The teaching of the Bardwell patent is particularly adapted for efforts in this area. In its simplest form, this procedure involves operating upon a selected small component of an overall image in the nature of a non-intersected line segment. The object is to follow the selected segment on the original image and to accurately reproduce that segment on a separate object. This sort of procedure is repeated over and over again, with additional procedures utilized to handle portions of the image not separable into non-intersecting segments (such as solids and crossed lines) until the entire overall reference image has been reproduced.

One traditional technique utilized to follow line segments has been the technique known as "thinning" or "stripping". In this methodology, the reference segment is reduced by various procedures to have a single unit thickness, as defined by the apparatus. This unit thickness may be in the nature of pixel, as in visual data bit representations, or some other unit of measurement. Once the selected line segment has been reduced to a single unit width, then it may be followed as it curves or otherwise changes directions throughout its length. This technique has been used extremely widely and is represented by the disclosure of the Evans, et al patent. One disadvantage of this technique is that line width data is lost in the transition. That is, line segments on the reference image having different thicknesses will nonetheless appear in the object image as having the same thickness.

It is always desirable to improve on prior techniques in any area. In the line following or line tracking field, it is particularly desirable to obtain object images which are as accurate a reproduction of the reference image as possible. It is also desirable to accomplish these goals as quickly as possible and with a minimum of expense in the way of mechanisms and auxiliary equipment. Minimizing operator intervention is also a desirable goal.

DISCLOSURE OF INVENTION

Accordingly, it is an object of the present invention to provide a line segment tracking system which preserves line width data from the reference image to the object image.

It is another object of the present invention to provide a system whereby a line segment may be reproduced and transposed in a fully automated procedure.

It is a further object of the present invention to provide a process for following a line segment image utilizing a digital array of the image as an integral working reference.

Briefly, the preferred embodiment of the present invention is a line segment following system adapted for use of an inventive process for following a reference image of a non-intersecting line segment having a discrete width which does not exceed a preselected maximum and providing the means for transposing such image into a separate medium. The system and process are specifically adapted for use with visual scanning apparatus capable of creating a two dimensional cartesian array of pixels representing, in an analog manner, the entire reference image. The analog representation is then stored in a cartesian data bit array which is utilized as the integral reference for the remaining aspects of the procedure. A line following process is then performed on the representational image in such a manner as to follow the line from an initial point until the end of the segment.

The method involves conventionally utilizing the reference representation as having a positive or "1" bit representing a dark portion of the original reference image and a negative or "0" bit as representing a light or background portion of the original image. The process utilizes proceeding from a randomly selected "1" bit to the end of the existing line by following continuously only along "1" bit elements.

The initial starting or "origin" bit is selected by random searching the analog grid until any positive bit is located; this positive bit being then defined as the origin. Once the origin is located, the number of continuous positive bits along a series of pre-selected vectors extending from the origin bit is counted for each of the vectors. The vectors are grouped in opposing pairs. The sum of and the difference between the counts on each of the opposing pairs is calculated and stored. The vector pair having the smallest sum represents the direction of the narrowest portion of the line segment and provides the width factor at that point. The operational point is then moved from the origin point to a bit along this vector pair until the difference between the opposing vector counts is no more than one. At this point the approximate center (width-wise) of the line segment has been located. The operational point is then moved, along a vector perpendicular to the width vector pairs; a single unit and the process is repeated with new operational points until the end of the line segment is reached. The process then returns to the center of the origin width vector pair and proceeds in a direction opposite to the initial direction until the other end of the line segment is reached. Thus, in two series of steps the entire line segment is followed and defined. The entire process may then be repeated for each separable line segment in the total image.

The elements utilized by the system include an optical scanning device and associated control elements, an analog, stored reference image creation and storage element, a tracking control apparatus an output control apparatus and an output device. The nature of output may be transitory visual, such as with a monitor, or permanent as in the case of a plotter, or both. The reference image storage medium may be in the nature of specific counting registers or may be handled with in computer memory apparatus.

The primary uses of the invention are related to architectural and electronic design drawing techniques, particularly those utilized in computer aided design operations. The invention is ordinarily utilized as one component of an overall system including mechanisms and procedures for handling elements other than simple line segment portions of the overall image. With these components included, the entire image may be transposed.

An advantage of the present invention is that it retains and reproduces line width information based upon an optical scanning technique.

A further advantage of the present invention is that it retains in an unchanged form, a reference analog image of the original image in a register adapted such that the image may be manipulated in various manners prior to output.

A further advantage of the invention is that it operates without direct operator intervention.

Yet another advantage of the present invention is that it is adapted for use with a wide variety of output devices.

A still further advantage of the present invention is that it is entirely digital in nature in the manner in which it analyzes and reproduces the analog reference image.

These and other objects and advantages of the present invention will become clear to those skilled in the art in view of the description of the best presently known mode of carrying out the invention and the industrial applicability of the preferred embodiment, as described herein and as illustrated in several figures of the drawing.

BRIEF DESCRIPTION OF THE DRAWING

FIG. 2 is a schematic illustration of a typical line segment on the original reference image to be manipulated or reproduced by the present invention;

FIG. 3 is a graphical illustration of the analog bit-mapped internal reference image utilized by the process of the invention;

FIG. 4 is a schematic illustration of a preferred arrangement of selected operational vectors;

FIG. 5 is a schematic illustration of the application of the selected vectors to a typical positive bit selected as a working point on the internal analog image;

BEST MODE OF CARRYING OUT INVENTION

The present invention is a line segment following sytem and an associated process for following a line segment image on a selected two dimensional medium and transposing it into a separate medium. The invention is particularly adapted for use with non-intersecting, bounded, discrete line segments having a length substantially greater than their width and having a width not exceeding a specified maximum. The system combines optical and digital techniques to achieve a line following technique which maintains width data and utilizes a stored reference analog image as a working element.

Figure 1:
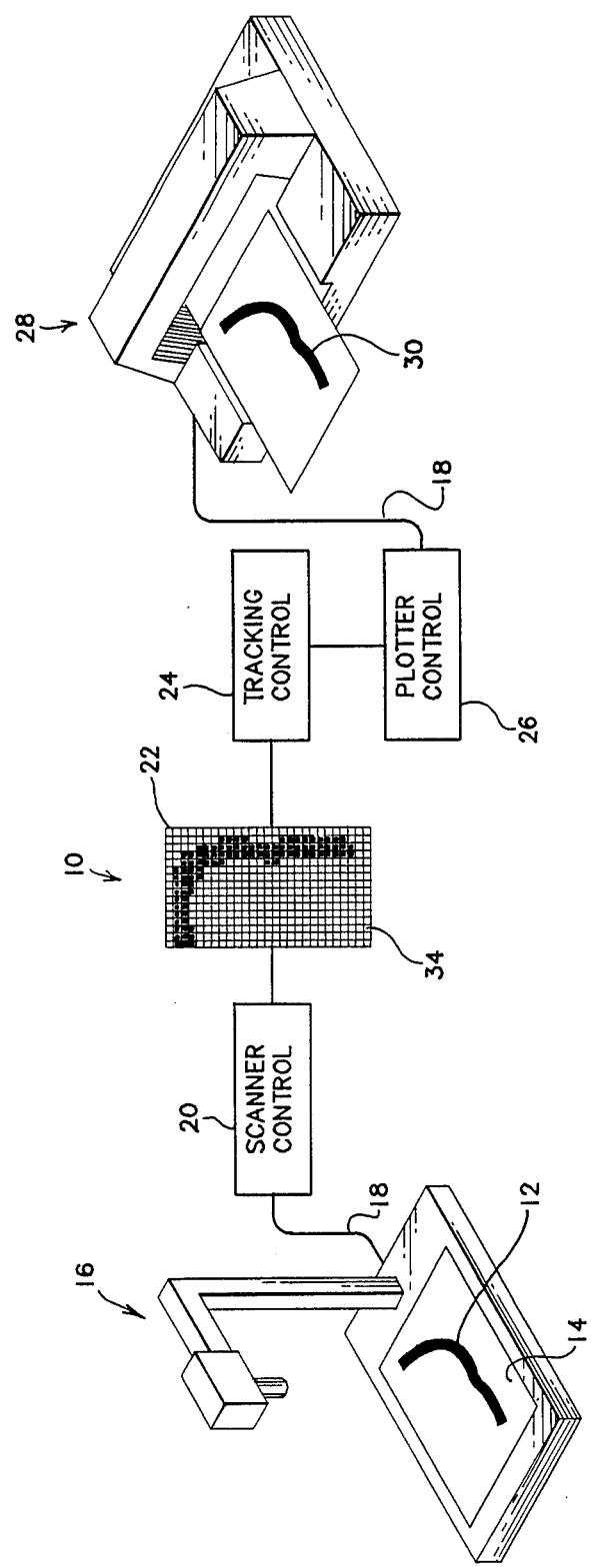
FIG. 1 is a schematic representation of a line following system according to the preferred embodiment of the present invention.

A line segment following system according to the preferred embodiment of the present invention is illustrated in a schematic fashion in FIG. 1 and designated by the general reference character 10. The system 10 involves elements for creating and storing data regarding the original image, analyzing and modifying the data and transposing the original image into a separate medium.

The preferred embodiment of the system 10 which is illustrated in FIG. 1 includes an arbitrarily selected line segment image 12 which is contained on a planar image surface 14, typically paper. The line segment image 12 is illustrated as being alone on the image surface 14 to permit clarity of explanation of the system 10 and the associated procedures. In actual usage the selected line segment image 12 will be merely one of a great plurality of segments present in the overall original image.

The line image 12 is scanned by an optical scanner device 16 which is capable of creating an analog of the line segment 12 as an array of dark and light pixels. This pixel array will be a two dimensional, or the digital equivalent of two dimensional, array having a light pixel conventionally representing the background of the image surface 14 and a dark pixel conventionally representing a portion of the line segment image 12, although this combination may be readily reversed if so desired.

Information generated by the scanning device 16 is carried by signal carrying connectors 18 to a scanner control module 20 for further transmission. The scanner control 20 operates both as an information intermediary and to send signals through the signal carrying connector 18 to the scanning device 16 for the purpose of controlling the tracking methodology of the scanning device 16. The scanner control 20 sends the signals generated by the scanning device 16 onward to a medium for creation of an analog image 22, shown in a schematic fashion in FIG. 1.

The analog image 22, shown more clearly in FIG. 3, is a cartesian array of positive bits and negative bits representing dark and light pixels as created by the scanning device 16. Once created, the analog image 22 is operated upon by a tracking control module 24 which is utilized to carry out the primary steps of the line following process of the present invention.

Once the processes undertaken by the tracking control module 24 are completed, in the nature of analysis and operations upon the analog image 22, the output of the tracking control module 24 is directed through additional signal carrying connectors 18 to a plotter control module 26 which is adapted for sending direct signals to a conventional plotter 28 which then translates those signals into a reproduced image 30.

As shown in FIG. 1, the reproduced image 30 is a copy of the initial line segment image 12, retaining all aspects of curvature and line width. The selection of a plotter control module 26, a plotter 28 and a two dimensional physical reproduced image 30 is a matter of choice. The system 10 can be utilized equally well to create an image on a monitor screen or other two dimensional representational device, or by transmitting the analog image to a program or device to modify the result, such as CAD systems.

The invention is best understood by following the operation of the system 10 with respect to a specific, although arbitrarily selected, line segment image 12 such as that illustrated in FIG. 2. This is the same image shown in FIG. 1. The selected line segment image 12 is charactized by having an irregular curvature and differing line width at various portions of the segment, and is further characterizable as a typical line segment in that it has a length substantially greater than its width and a total width at any given point that is not so great as to qualify the image as a solid rather than a line segment.

When the line segment image 12 is scanned by the scanning device 16, a reference analog image 22, such as that illustrated in FIG. 3, is created. The nature of the scanning device 16 is such that it digitizes the image in that it analogously breaks the image 12 into discrete components of identical size and shape, commonly known as "bits". Each discrete bit corresponds to a specific location on the original line segment image 12. The bits are arrayed, either physically or analogously, in a rectangular cartesian array with each bit therein having a specific x coordinate and a y coordinate. The address of each bit can be thus be stated as an (X,Y) expression.

Conventionally, a bit corresponding to a dark pixel, or a dark point on the original line image 12, is referred to as a positive bit 32, also known as a "1-bit". Those bits corresponding to light or background positions on the original image 12 are known as light bits, negative bits, or "0-bits" 34.

The number of positive bits which actually correspond to the selected image 12 is dependent upon the resolution of the instrumentation. If the scanner device 16 is selected to have very high resolution then the line image 12 would be represented by an analog image 22 carrying substantially greater number of positive bits 32 than are illustrated in FIG. 3. The illustration in FIG. 3 is very coarse in nature for a line image 12 such as that selected. The selection was made to provide for clarity and understanding the process of the invention.

The analog image 22 is an actually existing physical element created electronically by the optical scanning device 12. However, it also exists as a digital array and may be considered as a defined array of 1's and 0's within computer memory. The two dimensional continuity and positioning of each of the bits with respect to each other bit are mathematically defined within a memory structure. The virtual digital array created in this manner corresponds precisely to a physically represented array such as that shown as the analog image 22.

Once the analog image 22 and the digital reflection thereof have been created, the process of the invention is utilized to follow the line segment 12 from any given selected point to its end. In order to accomplish this, it is necessary to define a set of preselected set of vectors 36 (shown in FIG. 4) extending outward from à common point. Although any even number of vectors 36 may be selected, it is conventional and appropriate to utilize the eight vector pattern illustrated in FIG. 4 for analysis of the analog image 22. The eight numbered vectors illustrated in FIG. 4 represent the positive and negative X and Y directions as well as the possible direct diagonal directions, both positive and negative, in standard cartesian grid nomenclature. Each positive vector 36 has a corresponding opposing negative vector which combines with the positive vector to form a complete line. These opposing vectors 36 (such as 1 and 5, or 3 and 7) constitute vector pairs 38.

FIG. 5 illustrates the application of the directional vectors 36 of FIG. 4 to an arbitrarily selected origin bit 39 on the analog image 32. The origin bit 39 is determined by randomly searching the entire grid forming the analog image 22 until any positive bit 32 is located. This first-located positive bit becomes the designated origin bit 39. The origin bit 39 provides the initial reference point as the origin of the selected vectors 36 for use in analysis of the line segment data.

Figure 6:
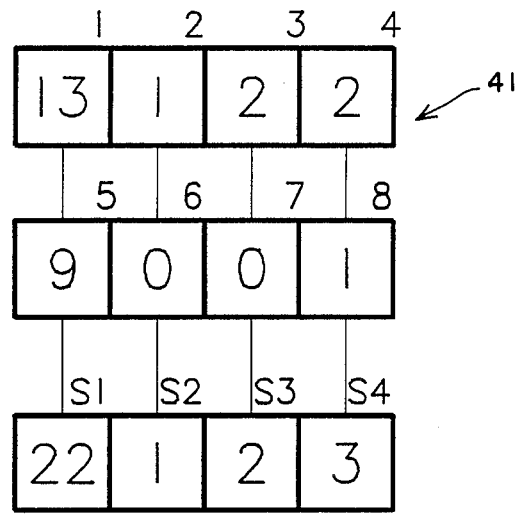
FIG. 6 is a tabular representation of the vector count results achieved in applying process of the present invention to the working point illustrated in FIG. 5.

The operation of the system and process with respect to the origin bit 39 on the given analog image 22 is primarily a series of counting consecutive positive bits existing along each of the selected vectors 36. For the example shown in FIG. 5 the results may be tabulated as shown in FIG. 6. In this case it is seen that if selected vector 1 is followed, a total of thirteen consecutive positive bits are found along vector 1 before the first negative bit is encountered. Similarly, only one positive bit is found along vector 2 prior to the first encounter with a negative bit. In the case of vectors 6 and 7 there are no positive bits appearing on these vectors as the first bit encountered is a negative bit. Consequently, a value appearing in the table of FIG. 6 for vector 1 is thirteen, the value for vector 2 is one and the values for each of vectors 6 and 7 is zero. It is noted that even though vector 8 eventually re-encounters positive bits, due to curvature of line segment 12, these are not included in the count for vector 8 since the count continues only until the first negative bit is encountered.

Once the results of the count on each of the selected vectors 36 have been tabulated, as shown in the upper two rows of FIG. 6, the totals for the vector pairs are summed as shown in the bottom row of FIG. 6. In this case it may be seen that the sum of the positive bits along vectors 1 and 5 is twenty-two, the sum along the opposing vector pair, including vectors 2 and 6 is only one, the sum of vectors 3 and 7 is two, and the sum of vectors 4 and 8 is three for the example shown in FIG. 5.

Once the sums have been determined and tabulated as shown in the bottom row of FIG. 6, the vector pair having the smallest sum is selected as representative of the direction of minimum width of the line segment 22 at that particular location. In the example utilized, for origin point 39, the vector pair including vectors 2 and 6 has the smallest sum and is thus representative of the minimum width of the line segment 12 at the selected position. The analysis then proceeds by defining a new working poitn 40 which is displaced by one unit from the origin point 39 along a selected directional vector. The selected directional vector is one of the two possible vectors aligned perpendicularly to the vector pair 38 having the smallest sum as has been defined for the origin point 39. In the preferred embodiment of the present invention, the initial choice between the two possible perpendicular directional vectors selected for establishing the working point 40 is that which is most "northward". That is, for the initial movement of the operational point from the origin 39 to the working point 40, the direction of movement will always proceed along a vector selected from vectors 1, 2, 3 and 8 and will never proceed along vectors 4, 5, 6 or 7.

Once the first working point 40 subsequent to the origin point 39, designated as 40(1), has been designated, the same analysis procedure which was performed on the origin point 39 is then performed on the current working point 40(1). A new tabulation on the count of each of the selected vectors 36 is prepared with respect to the new working point 40(1), the minimum width vector pair 38 is determined and the direction of travel to the next working point 40(2) is thereby determined and the operational point is moved to the next working point 40(2). This process is repeated continually with each working point 40(n) to define each subsequent working point 40(n+1).

In the event that a selected perpendicular vector to move to the next working point 40(n+1) causes the working point to be moved to a 0-bit, then this is an indication that the line segment 22 is turning. In order to continue the process, this result is rejected by the logic of the system and a vector offset by 45° from the selected perpendicular vector is substituted therefor. In this instance, the working point 40(n+1) will always be situated within the line segment analog image 22 although it will not always lay along a direct perpendicular to the minimum width vector pair for the prior working point 40(n).

The process is continued in this manner until the perpendicular vector, and each of the 45° offset vectors therefrom, cause the working point 40(n+1) to be moved to a 0-bit. When this condition obtains the end of the line segment 22 has been located and the process terminates. By this manner the entire portion of the line segment proceeding in the northward direction from the origin point 39 will have been mapped and followed by the process. Once this has been accomplished, the analysis returns to the origin point 39 and the procedure is repeated, only this time the selected perpendicular vector or movement of the working bit 40 is chosen to be the one that is most "southward". With this modification, the process is again repeated until the opposing end of the line segment is located and the data has been stored for the entire segment.

The tabulated counts for each of the vectors 36, such as that shown in FIG. 6, are stored in memory for each working point 40 utilized in the process. Similarly, the sum data for each the vector pairs 38, correlated to each working point 40, is maintained. Furthermore, the address in terms of x and y coordinates for each of the working points 40(n) utilized during the process is maintained in correlated connection with the count data in memory for ready analysis and used. The existence of this data insures that the same specific bit may never become a working bit 40 more than once, with the single exception of the origin bit 39, and that the process never reverses direction to track back upon itself.

An enhancement of the process which increases its value and is part of the preferred embodiment is to always maintain the current working bit 40 at a position as close as possible to the lateral "center" of the line segment for a given location along the segment 22. This enhancement may be accomplished by using the same counts generated in the process and shown in FIG. 6. An additional step of calculating the diffence between each of the components of a selected vector pair 38, rather than the sum of the two counts, is incorporated to accoplish the centering.

The minimum width vector pair 38 will have already been determined during the basic process with respect to any given working point 40. An error check is then performed by the process to determine whether the two vectors 36 making up the minimum width vector pair 38 have a difference of count of greater than one. If a difference of greater than one exists, then an error is determined. Error conditions mean that the working point 40 is not presently situated along the center (bisector) of the line segment 12. When this is the case, the working point 40 is moved to the center of the line segment 22 by moving it towards the higher count vector 36 of the minimum width vector pair 38 until the difference between the opposing vectors 36 in that pair is 1 or 0. At this point the error condition will no longer obtain and the working point 40 will be centered on the segment 22. The error check for centering the working point 40 is performed prior to moving to the next working point 40(n+1) in order to maintain the working points for the process as near as possible to the center of the line segment throughout the procedure. The adoption of this centering subprocess minimizes the number of actual working points 40 selected in following the analog segment 22 from the origin point 39 to the end of the segment. This speeds the process and minimizes the time necessary to accomplish the line following procedure.

It is noted that the numerical data generated by the measurements performed during the process is stored in memory and may be utilized and manipulated by various manipulative processes such as those involved in CAD systems.

Figure 7:
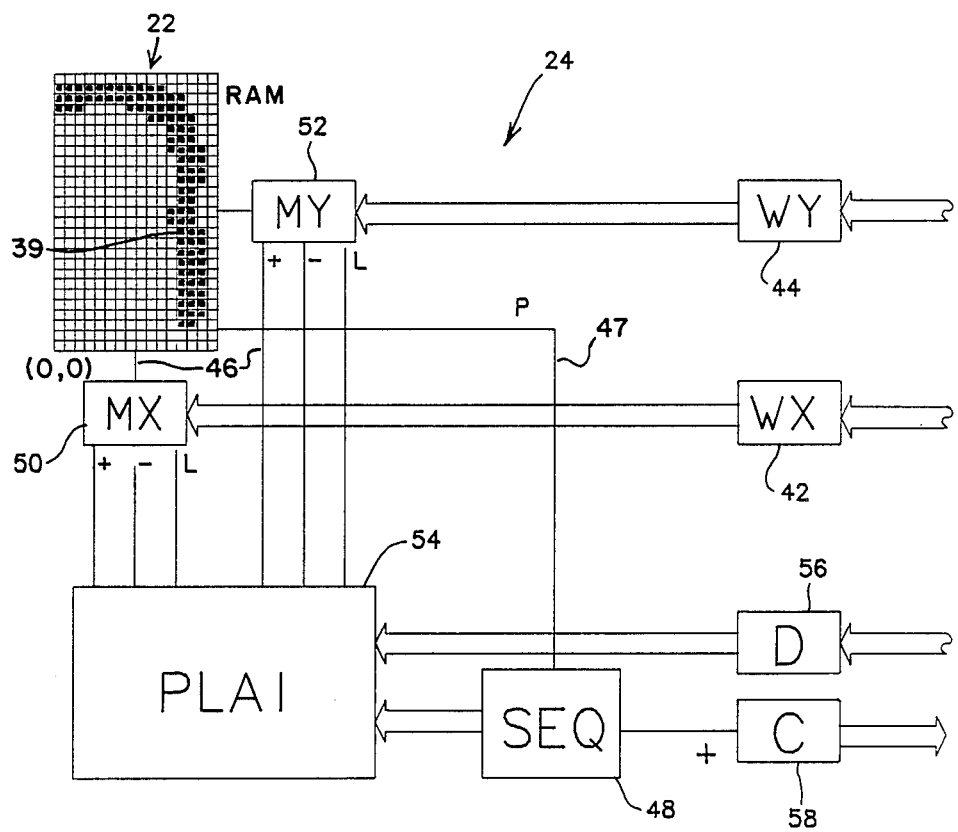
FIG. 7 is a schematic illustration of the typical components utilized to count and maintain the results of the process illustrated in FIGS. 5 and 6.

A typical arrangement of elements for carrying out the process illustrated in FIGS. 4, 5, and 6 upon a typical analog image 22 is illustrated in a schematic fashion in FIG. 7. It may be seen that the apparatus, which corresponds to the tracking control module 24 illustrated in FIG. 1, includes a number of discrete elements connected together to operate as a functional module.

The schematic illustration of FIG. 7 is a conventional type of logic diagram which would be readily recognizable to a logic designer. The portion of the apparatus illustrated in FIG. 7 is designed for accomplishing a counting of the positive bits along each of the selected vectors 36 within the analog image 22. The device utilizes standard digital components with specified programmable logic to control the interrelationship of the components. The specific logic would be readily apparent to a logic designer and is not decribed herein except by reference to effects.

The tracking control module 24 illustrated in FIG. 7 includes a working bit X coordinate register 42 and a cooresponding working bit Y coordinate register 44, the two working bit registers 42 and 44 carrying the address of the present working bit 40. The various components of the module 24 are connected by signal carrying lines 46 with a particular one of the lines 46 being designated as a line "P" 47.

The module 24 further includes a three position sequencer 48, a memory address X coordinate control register 50, a memory address Y coordinate control register 52, a programmable logic array 54, a direction selection register 56, and a count register 58. The overall module 24 also includes various elements (not shown) for storage of the output of the count register 58 as combined with the working point address registers 42 and 44 for each working point 40 and each directional vector 36 associated therewith (the output of the direction register 56).

The operation of the module 24 is best understood by following an example. Utilizing the same analog image 22 of the prior figures and the same origin bit 39, the analysis utilizing the module 24 would proceed as follows.

In order to establish the address locations in a digital manner, the bottom left bit shown as being part of the analog image 22 is assigned the address (0,0). In this coordinate system the origin point 39 has an address of (11, 10). An analysis to proceed upon the origin point 39, the address of the working point 40 (in this case origin point 39) would be stored in the working point address registers 42 and 44. The WX register 42 would have a value of eleven and the WY register 44 would have a value of ten for this point.

For the first analysis on the origin point 39 the system would be reset such that the MX register 50 and the MY register 52 are set equal to the values of the WX register 42 and the WY register 44 respectively. The directional vector register 56 would be assigned the initial value of one, corresponding to vector 1 of FIG. 1. The count register 58 would have an initial value of zero.

Once the system reset had occured, the sequencer 48 would then increment from a zero state to a one state and the programmable logic array 54 would direct an analysis of the next bit lying along the selected vector 36. In the case of vector one the X coordinate or, the value of register MX 50, would remain unchanged while the Y coordinate, the value of register MY 52, would be incremented by one. The sequencer 48 would then be incremented to a two state and the value of the bit corresponding to the addresses contained in registers 50 and 52 would be determined. If the bit corresponding to that address was a positive bit then the value of the count register 58 will be incremented and the sequencer 48 will cycle back to state zero for continuing the process. This procedure will be repeated until an analysis of the bit at the current address of registers 50 and 52 yields a negative bit. In this instance a signal is generated in line P 47 which triggers the end of the sequence. At the end of the sequence the value of count register 58 is saved, along with the values of working coordinate registers 42 and 44 and the selected directional vector count carried in register 56 as final data for that particular working point and vector. Once this data has been stored, then the directional register 56 is incremented by one and the count register 58 is reset to zero. The process is then repeated, in this case doing a count along vector 2 with the programmable logic array 54 causing each successive count location to involve a single incrementation of both the MX register 50 and the MY register 52 until a zero bit is encountered. The process will continue in this manner for each of the eight vectors until all of the data therefrom has been stored. When the "0" register 56 is caused to reset to vector one, then the entire system is reset, a new working point 40 is selected as stated above and the process repeats.

As is readily seen, this is only a small portion of the overall apparatus. However, it is the critical element for performing the steps illustrated in FIGS. 4, 5, and 6.

An alternative to the hardware array set forth in FIG. 7 would be to use internal digital logic, such as that contained in a personal computer read only memory, to accomplish the same objects and the physical registers and components illustrated in FIG. 7. A specific example of this utilization of the inventive process is found in the "CAD/Camera" product marketed by Autodesk, Inc. of Sausalito, Calif. Various other methods of incorporating the process and apparatus of the present invention are also possible.

As described above, the process of the invention may be utilized either with or without the centering subprocess. Although it is quicker in operation with the centering subprocess this does require additional memory as the difference between the counts on the opposing vectors 36 must also be maintained. Also, the number of vectors 36 utilized for analysis may be modified to be any even number that may be readily divisible into opposing vector pairs 38 which cover the entire available spectrum. For standard cartesian coordinates the selected number of vectors will typically be either four or eight, with eight being preferrable.

The type of output device selected for use with the line following system 10 may be a standard plotter 28 or may be any of numerous possible devices, such as a visual monitor. This selection of output devices at the user's discretion will frequently be dependent upon the desired specific application of the system and process.

Those skilled in the art will readily recognize that numerous and varied modifications and alterations to be apparatus and process of the present invention may be made without departing from the utility and spirit of the invention. Accordingly, the appended claims are not to be considered as limiting and are to be interpreted as encompassing the entire scope of the present invention.

INDUSTRIAL APPLICABILITY

The line following system and process of the present invention is readily adaptable for commercial use in the nature of recreating a selected visual line segment image in another medium, such as proceeding from a paper drawing to output on a plotter 28 shown in FIG. 1. Usages for such a system are found in the industrial and electronic design areas and in architecture. Various other commercial utilizations are also envisioned.

The system and process of the present invention has already acheived substantial commercial utility in the product known as "CAD/Camera" marketed by Autodesk, Inc., of Sausalito, Calif. The inventive system and process described herein forms a small component of this overall product.

Given the already demonstrated commercial and industrial utility of the present invention, and the myriad potential applications thereof, it is expected that the system and process of the present invention will be of great and continuing industrial utility and comemrcial viability.

I claim:

1. A method for capturing a two dimensional visual line segment image for the purpose of transposing the line segment image to a different medium, in steps comprising:

A. scanning the line image with an optical scanning device, said scanning device creating an analog of said line image in the form of a discrete array of dark pixels and light pixels, the pattern of said dark pixels within said array corresponding in shape to the image;

B. replicating said discrete array generated by said optical scanning device in a quantifiable, two dimensional, digital analog array wherein each point in said digital array corresponds to a single respective pixel in said discrete array; wherein points in said digital array corresponding to the background of the image are defined as negative points and points corresponding to non-background areas of the image are defined as positive points;

C. designating one of said positive points in said digital array as an origin;

D. counting the number of consecutive adjacent positive points lying on each of a plurality of preselected vectors from said origin, each of said preselected vectors forming one half of a vector pair with a directly opposing vector.

E. storing the count data determined in step D. for each of said preselected vectors and the sum of the counts for each of said vector pairs;

F. selecting a directional vector, said directional vector being perpendicular to the minimum width vector pair of the segment, said minimum width vector pair being defined as the vector pair having the lowest sum as determined in step E.;

G. selecting a working point, said working point being a positive point displaced from said origin by a unit displacement along said directional vector;

H. continually repeating step D., with the present working point being substituted for said origin, and steps E., F. and G., with each successive new one of said directional vectors being offset from the previous one of said directional vectors by no more than 45 degrees of arc, until no new working point along said directional vectors is a positive point; and I. providing the data collected and stored in the repetitions of steps D and E to an output device.

2. The method of claim 1 wherein;
   the number of said selected vectors is eight, spaced 45 degrees apart, with two of said vectors corresponding respectively with the positive and negative X axes and two of said vectors corresponding respectively to the positive and negative Y axes of said analog array.

3. The method of claim 2 wherein;
   said directional vector selected in step F is preferrably selected from those vectors including posititive Y coordinate components and that vector proceeding along the positive X axis; and
   subsequent to step H, the process returns to said origin point and step H is repeated with the modification that said directional vector selected in step F is preferrably selected from those vectors including negative Y coordinates and that vector proceeding along the negative X axis.

4. The method of claim 2 wherein;
   the vector proceeding along the positive Y axis is designated as vector 1 and the remaining vectors are labelled with consecutive integers 2 through 8, proceeding in a clockwise manner.

5. The method of claim 2 wherein;
   subsequent to step D, but prior to step E, the difference between the counts for the vectors in each of said vector pairs is calculated;
   subsequent to step E, but prior to step F, testing the difference between the vectors forming said minimum width vector pair and, if the absolute value of the difference is greater than one, then creating a temporary working point displaced along said minimum width vector pair to a point where said absolute value of the difference is less than or equal to one; and
   substituting said temporary working point for said origin point in step G.

6. The method of claim 1 wherein;
   said output device is selected from the group including a graphics plotter, a visual monitor and an image manipulation device such as a CAD system.

7. A line following system, for use in following an object image in the nature of a non-intersected line segment on a two dimensional background, comprising:
   an optical scanner device adapted to create a digital array of pixels corresponding to the object image;
   digital analog storage means for storing said digital array of pixels as a binary digital array;
   digital analysis means for determining and storing the count of the number of bits in said binary digital array corresponding to consecutive dark pixels lying along each of eight equally spaced vectors, with one of said vectors corresponding to the positive Y axis, for each of a series of bits, until the count data representing the entire line segment have been stored; and means for delivering said count data to translation means for subsequent delivery to an output device.

8. The system of claim 7 wherein;

the optical scanning device senses the object image by way of a linear array of sensing elements moved perpendicularly to the axis of said linear array along the object image so as to scan the entire image.

9. The system of claim 8 wherein;

the optical scanning device is a television camera.

10. The system of claim 7 wherein;

said series of bits is substantially less than the total number of bits in said binary digital array, except in such instances that the object image is so thin that said binary digital array has a thickness of fewer than a selected small number of bits along its length.

11. The system of claim 7 wherein each bit within said series of bits, with permissable exception of the first such bit, lies at or as near as possible to the center of the width of said binary digital array.

12. The system of claim 7 wherein;

the digital analog storage means is in the nature of digital computer memory; and the digital analysis means is a program for said digital computer.

13. A method for tracing a line segment in a drawing, in steps comprising;

a. scanning the drawing with an optical scanner including a linear row of sensor elements moved along the perpendicular axis of said row until the entire segment has been scanned;

b. storing the entire output of said optical scanner in a cartesian array of bits in a binary digital memory; and c. processing said cartesian array in a series of steps which operate only upon the stored cartesian array to generate a plurality of point coordinates representing the line segment.

14. The method of claim 13 wherein step C includes the substeps of:

C1. designating bits within said cartesian array which corresponding to the dark portion of the line segment as 1-bits and designating all other bits in said cartesian array as 0-bits;

C2. selecting any individual one of said 1-bits as an origin bit;

C3. designating said origin bit as the working bit $W(n)$, with the value of (n) set initially at zero;

C4. counting the number of consecutive 1-bits lying along each of eight equally rotationally spaced vectors emanating from said working bit $W(n)$ with one of said vectors proceeding along the positive axis of said cartesian array, with the results of each count being stored in memory in conjunction with the associated vector designator and the address of said working bit $W(n)$;

C5. designating each of said vectors and its opposite as a vector pair, such that four distinct vector pairs are defined;

C6. summing the total counts for each of said vector pairs and storing said sum in memory with the corresponding data of step C4;

C7. selecting the vector pair having the minimum sum and designating said pair as the minimun width vector pair;

C8. selecting a preferred transition vector perpendicular to said minimum width vector pair;

C9. if and only if the count for said preferred transition vector is zero, redesignating an alternate transition vector offset 45° from said preferred transition vector;

C10. designating a new working bit $W(n+1)$, said new working bit $W(n+1)$ being a 1-bit that is offset by one unit from said working bit $W(n)$ along said transition vector;

C11. repeating steps C4 through C10, with new working bit $W(n+1)$ substituted for working bit $W(n)$ until such time that said preferred transition vector and both possible of said alternate transition vectors have counts of zero; and C12. terminating the process.

15. The method of claim 14 including the additional substeps of:

C6A. deterimning the absolute difference between the counts for the opposing vectors consituting said minimum width vector pair; and C10A. if the difference determined in step 6A is greater than 1, redefining new working bit $W(n+1)$ as a bit offset along said minimum width vector pair, in the direction of the vector having a larger count, by a distance equal to one-half said difference.

16. The method of claim 14 wherein said preferred transition vector is selected from those vectors having positive Y components and that vector lying along the positive X axis.

17. The method of claim 14 and further including steps;

C11A. redefining said preferred transition vector as being selected from those vectors having negative Y components and that vector lying along the negative X axis; and C11B. repeating steps C3 through C11.

18. The method of claim 14 wherein except for said origin bit, the same bit is prevented from becoming the working bit $W(n)$ on more than one occasion.

* * * * *